United States Patent
Gray et al.

(10) Patent No.: US 11,578,471 B2
(45) Date of Patent: Feb. 14, 2023

(54) CIRCLE DRIVE SYSTEM WITH CLUTCH PROTECTION IN MOTOR GRADERS

(71) Applicant: Caterpillar Inc., Peoria, IL (US)

(72) Inventors: Eric Matthew Gray, Mt Zion, IL (US); Ernest Everett Stoops, Mt Zion, IL (US); Nathaniel Keith Harshman, Sullivan, IL (US)

(73) Assignee: Caterpillar Inc., Peoria, IL (US)

( * ) Notice: Subject to any disclaimer, the term of this patent is extended or adjusted under 35 U.S.C. 154(b) by 263 days.

(21) Appl. No.: 16/994,962

(22) Filed: Aug. 17, 2020

(65) Prior Publication Data
US 2022/0049456 A1 Feb. 17, 2022

(51) Int. Cl.
*E02F 3/84* (2006.01)
*E02F 3/76* (2006.01)
*E02F 9/22* (2006.01)

(52) U.S. Cl.
CPC .............. *E02F 3/844* (2013.01); *E02F 3/764* (2013.01); *E02F 9/2228* (2013.01); *E02F 9/2267* (2013.01); *E02F 9/2278* (2013.01)

(58) Field of Classification Search
CPC ... E02F 3/844; E02F 3/84; E02F 3/764; E02F 3/7668
See application file for complete search history.

(56) References Cited

U.S. PATENT DOCUMENTS

| | | | | |
|---|---|---|---|---|
| 2,195,306 A | * | 3/1940 | Henry | E02F 3/844 37/902 |
| 2,340,100 A | * | 1/1944 | Arndt | E02F 3/844 172/324 |
| 3,999,615 A | * | 12/1976 | Hart | E02F 3/844 172/742 |
| 7,874,377 B1 | * | 1/2011 | Graeve | E02F 3/7681 172/796 |
| 8,700,276 B2 | * | 4/2014 | Velde | B60W 10/11 701/51 |
| 9,540,787 B2 | * | 1/2017 | West | E02F 3/7668 |
| 9,644,341 B2 | * | 5/2017 | Yoshimura | E02F 3/7645 |
| 2012/0073890 A1 | * | 3/2012 | Bindl | E02F 3/764 180/374 |
| 2019/0186101 A1 | * | 6/2019 | Stoops | F15B 13/027 |

* cited by examiner

*Primary Examiner* — Thomas E Lazo

(57) ABSTRACT

A circle drive system with clutch protection in motor graders is disclosed. The circle drive system includes a hydraulic motor that is configured to receive a pressurized fluid and generate a torque for a rotation of a circle and a moldboard. The circle drive system also includes a gearbox to transfer the torque generated by the hydraulic motor to the circle. Further, the circle drive system includes a clutch connected to the hydraulic motor at one end and to the gearbox at another end. In addition, the circle drive system also includes a hydraulic circuit having a pressure relief valve to relieve the pressurized fluid supplied to the hydraulic motor when a pressure of the pressurized fluid exceeds a predefined threshold. The pressure relief valve thereby, limits the torque generated by the hydraulic motor to less than or equal to a torque capacity of the clutch.

16 Claims, 3 Drawing Sheets

CIRCLE DRIVE SYSTEM WITH CLUTCH PROTECTION IN MOTOR GRADERS

TECHNICAL FIELD

The present disclosure relates in general to motor graders. More particularly, the present disclosure relates to a circle drive system with clutch protection in motor graders.

BACKGROUND

Construction machines, such as motor graders, commonly include an implement, referred to as a moldboard, that is applied to grade a surface during operations such as paving roads. Such an implement may be swiveled or rotated at different angles in order to grade the surface. Typically, a circle drive system powers a circle that in turn facilitates the swiveling or rotation of the implement. The circle drive system generally includes a hydraulic motor that generates torque and a gearbox that transfers the torque generated by the hydraulic motor to the circle. The circle drive system may also include a clutch that is positioned between the hydraulic motor and the gearbox to protect various structural components in the circle drive system including the gearbox and the circle. However, for instances when the torque generated by the hydraulic motor exceeds a torque capacity of the clutch, the clutch may overheat and fail.

U.S. Pat. No. 7,874,377 relates to a motor grader that is equipped with a circle drive arrangement including a variable displacement motor. The variable displacement motor includes a displacement adjuster movable between maximum and minimum displacement positions. A pressure responsive control device is coupled to the displacement adjuster for selectively moving the displacement adjuster between the maximum and minimum displacement positions.

SUMMARY OF THE INVENTION

In an aspect of the disclosure, a motor grader with a circle drive system is disclosed. The motor grader includes a moldboard configured for grading a surface and a circle coupled with the moldboard to facilitate a rotation of the moldboard. The motor grader also includes a circle drive system for the circle. The circle drive system includes a hydraulic motor that is configured to receive a pressurized fluid and generate a torque for the rotation of the circle and the moldboard. The circle drive system also includes a gearbox to transfer the torque generated by the hydraulic motor to the circle. Further, the circle drive system includes a clutch connected to the hydraulic motor at one end and to the gearbox at another end. In addition, the circle drive system also includes a pressure relief valve configured to relieve the pressurized fluid supplied to the hydraulic motor when a pressure of the pressurized fluid exceeds a predefined threshold. The pressure relief valve, thereby, limits the torque generated by the hydraulic motor to less than or equal to a torque capacity of the clutch.

In another aspect of the disclosure, a circle drive system with clutch protection in motor graders is disclosed. The circle drive system includes a hydraulic motor that is configured to receive a pressurized fluid and generate a torque for the rotation of the circle and the moldboard. The circle drive system also includes a gearbox to transfer the torque generated by the hydraulic motor to the circle. Further, the circle drive system includes a clutch connected to the hydraulic motor at one end and to the gearbox at another end in order to protect the gearbox. In addition, the circle drive system also includes a pressure relief valve configured to relieve the pressurized fluid supplied to the hydraulic motor when a pressure of the pressurized fluid exceeds a predefined threshold. The pressure relief valve, thereby, limits the torque generated by the hydraulic motor to less than or equal to a torque capacity of the clutch.

In yet another aspect of the disclosure, a method for protecting the clutch driven by a hydraulic motor to operate a circle of the motor grader is disclosed. The method includes providing a pressure relief valve to relieve a pressurized fluid supplied to the hydraulic motor when a pressure of the pressurized fluid exceeds a predefined threshold. The relieving of the pressure by the pressure relief valve, thereby, limits a torque generated by the hydraulic motor to less than or equal to a torque capacity of the clutch.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
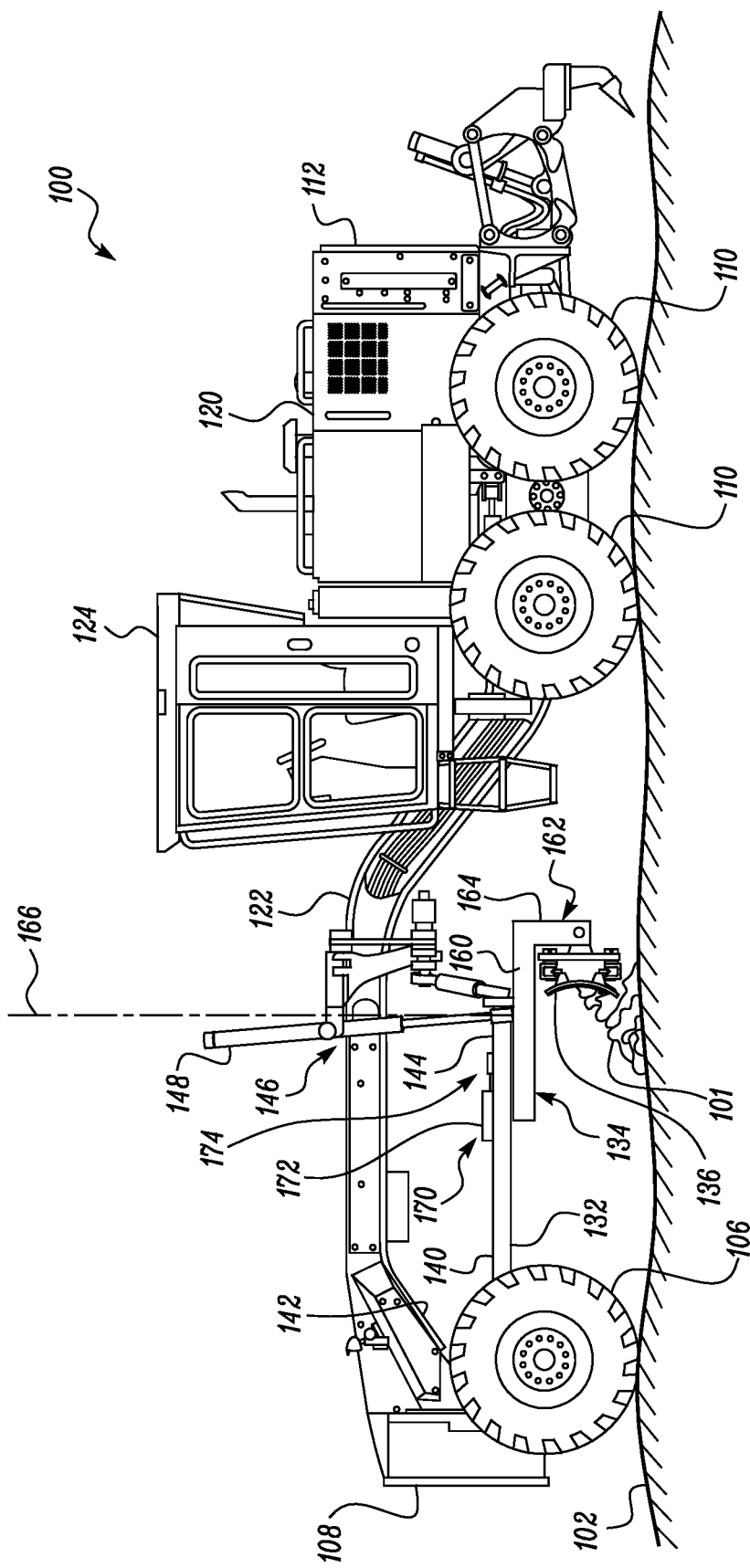
FIG. 1 is a grading machine, in accordance with an embodiment of the present disclosure.

Referring to FIG. 1, a grading machine 100, herein referred to as, "motor grader 100" is disclosed. The motor grader 100 may be used to displace, spread, distribute, level, and grade materials 101, such as soil, over a work surface 102 such as, for example, a dirt road. The motor grader 100 may include a set of front wheels 106 disposed towards a front end 108 of the motor grader 100 and a set of rear wheels 110 disposed towards a rear end 112 of the motor grader 100. A rotation of the set of front wheels 106 and set of rear wheels 110 may be powered by a power source, such as an engine (not shown), housed in a power compartment 120 of the motor grader 100. Further, the motor grader 100 may include a frame 122, and an operator cab 124 that houses controls of the power source and various implements of the motor grader 100, supported on the frame 122.

The motor grader 100 may also include a drawbar 132, a circle assembly 134, and a moldboard 136 supported by the frame 122. The drawbar 132, the circle assembly 134, and the moldboard 136 may function in tandem to perform the grading operation on the work surface 102. The drawbar 132 may include a first end 140 pivotally coupled to a front end 142 of the frame 122 and a second end 144 movably supported by another portion (such as a mid-portion 146) of the frame 122. For example, the second end 144 of the drawbar 132 may be coupled to the mid-portion 146 of the frame 122 via one or more actuators, such as a hydraulic actuator 148. The hydraulic actuator 148 may be actuated to raise or lower the second end 144 of the drawbar 132 with respect to the frame 122, in turn allowing the moldboard 136 to be raised or lowered relative to the work surface 102.

The circle assembly 134 includes a circle 160 and a pair of arms 162. The circle 160 rotates relative to the drawbar 132 about a rotation axis 166 that passes through a center of the circle 160. In an embodiment, the circle 160 may be an annular gear or a ring gear. The pair of arms 162 may extend from the circle 160 and may rotate with a rotation of the circle 160, relative to the drawbar 132. It may be apparent that only one arm 164 of the pair of arms 162 is visible in an orientation of the motor grader 100 as shown in FIG. 1. The pair of arms 162 may be diametrically opposed and spaced apart with respect to each other.

The moldboard 136 is supported by the pair of arms 162. The moldboard 136 is a ground engaging tool adapted to engage the grade materials 101 over the work surface 102 in order to grade and level the work surface 102. The moldboard 136 may be contoured to have a variety of other shapes such as, for example, a concave shape and a planar shape. The moldboard 136 may be moved to a host of work-related positions relative to the work surface 102. For example, the moldboard 136 may be raised or lowered relative to the work surface 102 by raising and lowering the second end 144 of the drawbar 132 relative to the frame 122 by use of the hydraulic actuator 148. Further, the moldboard 136 may be rotated about the rotation axis 166 corresponding to the rotation of the circle 160 about the rotation axis 166.

Figure 2:
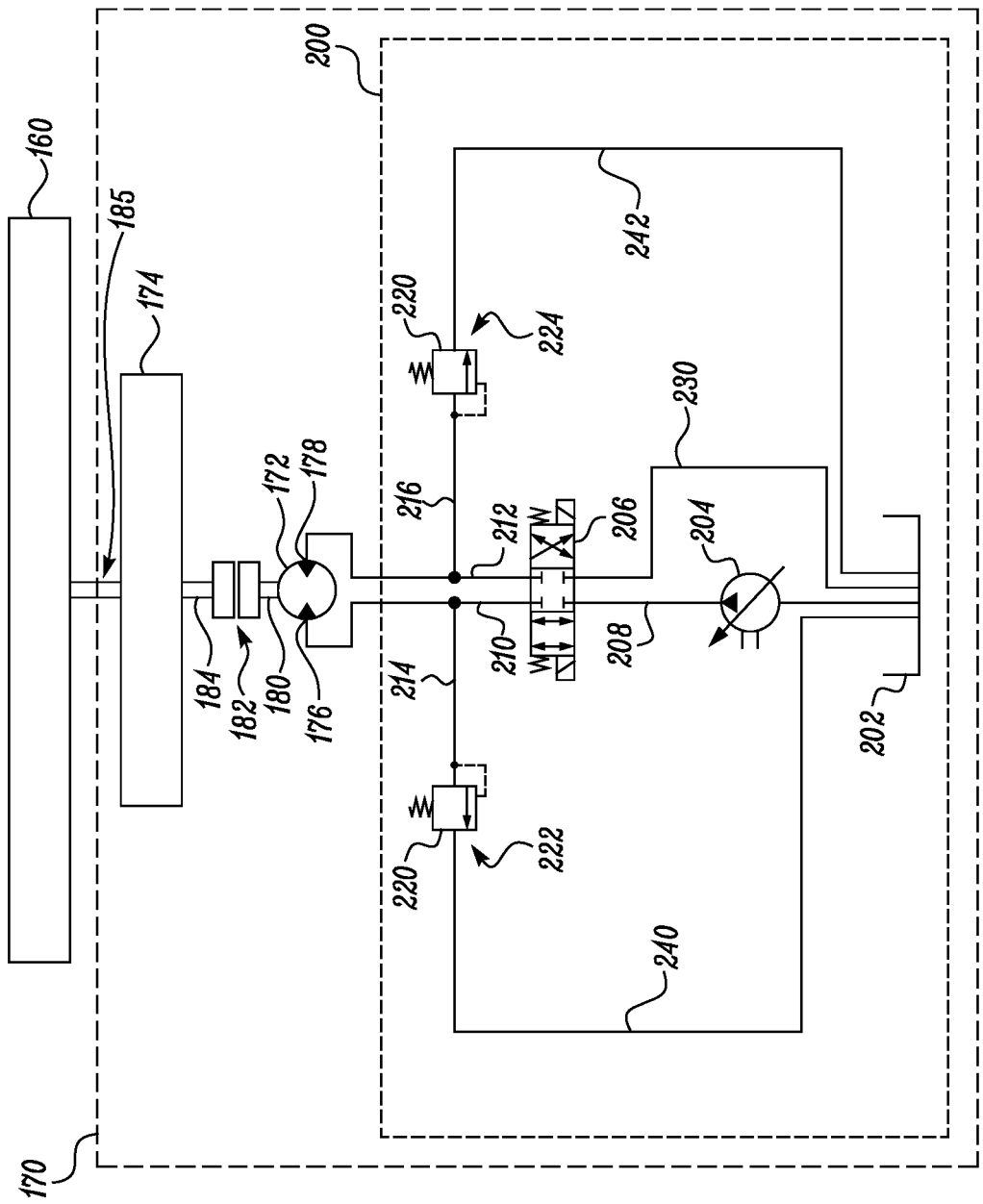
FIG. 2 is a schematic circuit diagram of a circle drive system in the motor grader of FIG. 1, in accordance with the embodiment of the present disclosure.

The motor grader 100 also includes a circle drive system 170 to the drive the circle 160. The circle drive system 170 facilitates the rotation of the circle 160 and in turn, the moldboard 136, about the rotation axis 166. Referring to FIGS. 1-2, a first embodiment of the circle drive system 170 is disclosed. The circle drive system 170 includes a hydraulic motor 172 and a gearbox 174 coupled with the hydraulic motor 172. The circle drive system 170 also includes a clutch 182 connected to the hydraulic motor 172 at one end and to the gearbox 174 at another end. In addition, the circle drive system 170 also includes a hydraulic circuit 200 connected to the hydraulic motor 172.

The hydraulic motor 172 may be configured to receive a pressurized fluid and generate a torque for the rotation of the circle 160 and in turn, the moldboard 136. In an embodiment, the hydraulic motor 172 may be a bi-directional motor and may facilitate the rotation of the circle 160 in a clockwise direction or a counterclockwise direction. The hydraulic motor 172 may include at least two ports 176, 178 for an entry and exit of the pressurized fluid into and from the hydraulic motor 172. The hydraulic motor 172 may be configured to receive the pressurized fluid via the first port 176 to facilitate the rotation of the circle 160 in the clockwise. Similarly, the hydraulic motor 172 may be configured to receive the pressurized fluid via the second port 178 to facilitate the rotation of the circle 160 in the counterclockwise direction. The torque generated by the hydraulic motor 172 may be proportional to a pressure of the pressurized fluid supplied to the hydraulic motor 172. The hydraulic motor 172 may be coupled with the clutch 182 via an output shaft 180 connected to the hydraulic motor 172.

The gearbox 174 may be coupled with the clutch 182 via a drive shaft 184 and facilitate a transfer of the torque generated by the hydraulic motor 172 to the circle 160. In an embodiment, the gearbox 174 may include an arrangement of gears (not shown) such as, a worm drive arrangement of gears and/or an epicyclic arrangement of gears. Other types of arrangement of gears may be contemplated for the gearbox 174, and the ones disclosed above need not be seen as limiting in any way. In an embodiment, the arrangement of gears may also be coupled with a gearbox shaft 185 that may be configured to cooperate with teeth (not shown) provided in the circle 160 in order to drive the circle 160.

The clutch 182 may be connected to the hydraulic motor 172 via the output shaft 180 at one end and to the gearbox 174 via the drive shaft 184 at another end. In an embodiment, the clutch 182 may be a slipper clutch configured to be in a "closed" position and/or a "slipping" position with respect to the output shaft 180 during operation. In the closed position, a rotation of the output shaft 180, as a result of the torque generated by the hydraulic motor 172, may in turn rotate the clutch 182 and the drive shaft 184 connected with the clutch 182. The clutch 182 may thereby transmit the torque generated by the hydraulic motor 172 to the gearbox 174. In the slipping position, the clutch 182 may "slip" or partially disengage from the output shaft 180 when a speed of the output shaft 180 is lowered in comparison to a speed of the drive shaft 184. As a result of lowering the speed of the output shaft 180, a torque, referred to as a "back torque", may be transmitted back from the moldboard 136 to the gearbox 174 and the drive shaft 184. The slip may occur when the back torque from the drive shaft 184 is greater than the torque of the output shaft 180. The clutch 182 may revert back to the closed position from the slipping position when the speed of the drive shaft 184 matches the speed of the output shaft 180, thereby engaging the clutch 182 with the output shaft 180 completely. As a result, the clutch 182 may protect the gearbox 174, the circle 160, and the moldboard 136 from damage when the speed of the output shaft 180 is lowered. The clutch 182 may also define a torque capacity that corresponds to an amount of the torque transmitted by the clutch 182 to the gearbox 174 in the closed position or in the slipping position. Additional examples of the clutch 182 include, but not limited to, a friction clutch, a centrifugal clutch, a semi-centrifugal clutch, a conical spring clutch or diaphragm clutch, a positive clutch, a hydraulic clutch, an electromagnetic clutch, a vacuum clutch, or an overrunning clutch or freewheel.

In order to protect the clutch 182, the hydraulic circuit 200 includes pressure relief valves 220 to limit the torque generated by the hydraulic motor 172 to less than or equal to the torque capacity of the clutch 182. The pressure relief valves 220 may be configured to relieve the pressurized fluid supplied to the hydraulic motor 172 when the pressure of the pressurized fluid exceeds a predefined threshold. The hydraulic circuit 200 may also include a tank 202 for storing a fluid and a pump 204 configured to draw the fluid from the tank 202 to pressurize the fluid. Further, the hydraulic circuit 200 may include a directional control valve 206 that receives the pressurized fluid from the pump 204 via a supply fluid line 208 and directs the pressurized fluid to the hydraulic motor 172.

The directional control valve 206 may selectively direct the pressurized fluid to the hydraulic motor 172 via a first fluid line 210 or a second fluid line 212 extending from the directional control valve 206 to the hydraulic motor 172. The directional control valve 206 may selectively direct the pressurized fluid to the hydraulic motor 172 via the first fluid line 210 in order to facilitate the rotation of the circle 160 (see FIG. 1) in a clockwise direction. The hydraulic motor 172 may then discharge the fluid back to the directional control valve 206 via the second fluid line 212. The directional control valve 206 may direct the discharged fluid received from the hydraulic motor 172 to the tank 202 via a discharge fluid line 230 that extends from the directional control valve 206 to the tank 202. Similarly, directional control valve 206 may selectively direct the pressurized fluid to the hydraulic motor 172 via the second fluid line 212 in order to facilitate the rotation of the circle 160 in a counterclockwise direction. The hydraulic motor 172 may then discharge the fluid back to the directional control valve 206 via the first fluid line 210. The directional control valve 206 may receive the discharged fluid from the hydraulic motor 172 and direct the discharged fluid to the tank 202 via the discharge fluid line 230.

The pressure relief valves 220 may include a first pressure relief valve 222 coupled with the first fluid line 210 via a fluid line 214 and a second pressure relief valve 224 coupled with the second fluid line 212 via a fluid line 216. The first pressure relief valve 222 may be configured to relieve the pressurized fluid in the first fluid line 210 when the pressure exceeds the predefined threshold. The first pressure relief valve 222 may relieve the pressurized fluid by discharging a portion of the pressurized fluid from the first pressure relief valve 222 to the tank 202 via a first relief fluid line 240. Similarly, second pressure relief valve 224 may be configured to relieve the pressurized fluid in the second fluid line 212 when the pressure exceeds the predefined threshold. The second pressure relief valve 224 may relieve the pressurized fluid by discharging a portion of the pressurized fluid from the second pressure relief valve 224 to the tank 202 via a second relief fluid line 242. The pressure relief valves 220 may, thereby, limit the pressurized fluid supplied to the hydraulic motor 172 and hence, the torque generated by the hydraulic motor 172 to less than or equal to the torque capacity of the clutch 182. In some embodiments, the predefined threshold defined by the pressure relief valves 220 respectively may be varied in order to vary the torque generated by the hydraulic motor 172.

Figure 3:
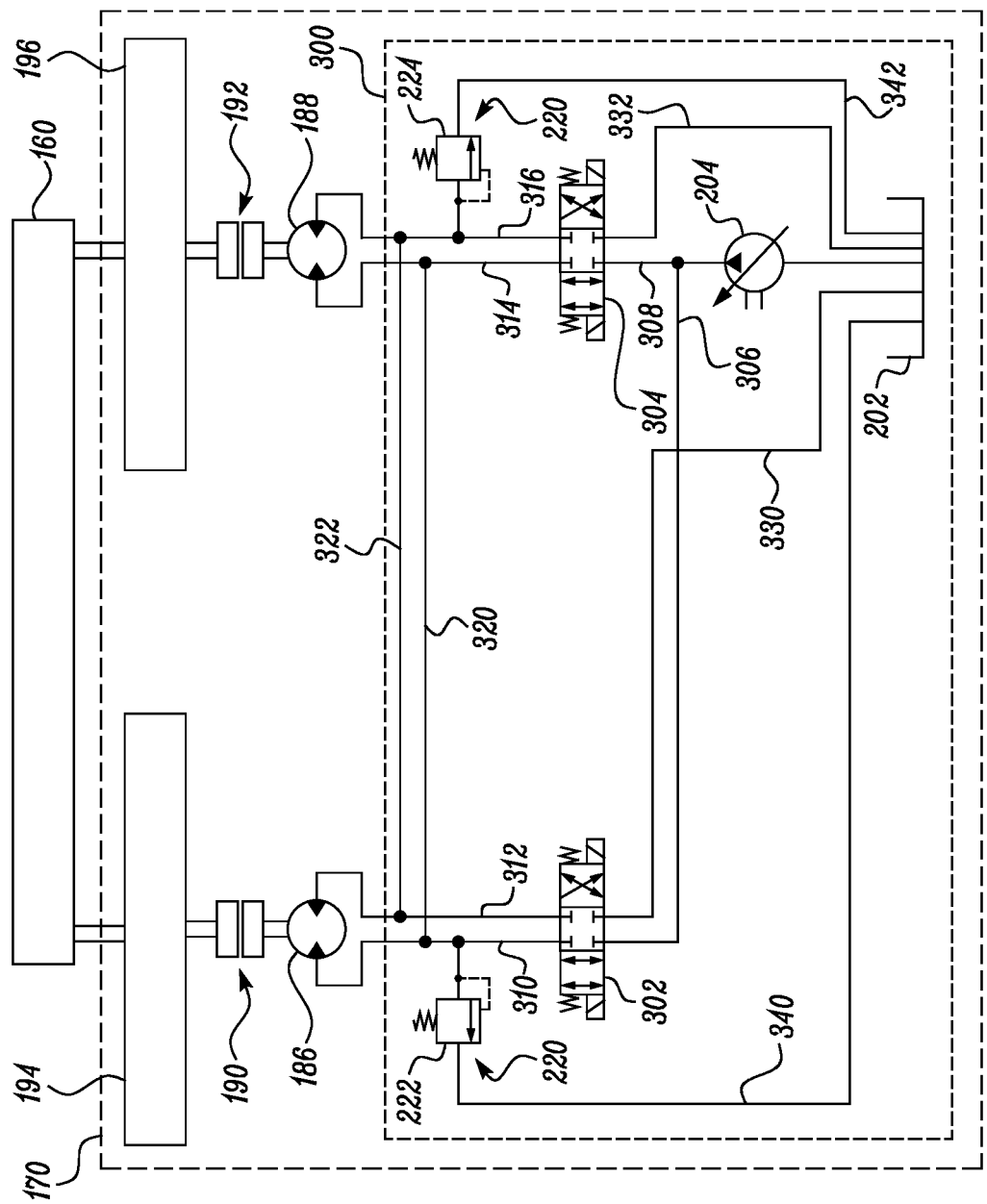
FIG. 3 is a schematic circuit diagram of a circle drive system in the motor grader of FIG. 1, in accordance with another embodiment of the present disclosure.

Referring to FIG. 1 and FIG. 3, a second embodiment of the circle drive system 170 is disclosed. The circle drive system 170 may include hydraulic motors 186, 188 similar to the hydraulic motor 172 of FIG. 2. The hydraulic motors 186, 188 may include a first hydraulic motor 186 and a second hydraulic motor 188 that may be configured to generate the torque for the rotation of the circle 160 and the moldboard 136. The circle drive system 170 may also include gearbox 194, 196 similar to the gearbox 174 of FIG. 2 to transfer the torque generated by the hydraulic motors 186, 188 to the circle 160 respectively. In an embodiment, the circle drive system 170 may include a single gearbox unit such as, for example, the gearbox 174 of FIG. 2 to transfer the torque generated by the hydraulic motors 186, 188 to the circle 160 respectively. Further, the circle drive system 170 may include clutches 190, 192 similar to the clutch 182 of FIG. 2. The clutches 190, 192 may be coupled with the hydraulic motors 186, 188 and the gearbox 194, 196 respectively. In order to protect the clutches 190, 192, the circle drive system 170 may include a hydraulic circuit 300.

The hydraulic circuit 300 may be configured to supply pressurized fluid to the hydraulic motors 186, 188. The hydraulic circuit 300 may include pressure relief valves 222, 224 similar to the pressure relief valves 220 of FIG. 2 to limit the torque generated by the hydraulic motors 186, 188 to less than or equal to the torque capacity of the clutches 190, 192 respectively. The pressure relief valves 222, 224 may be configured to relieve the pressurized fluid supplied to the hydraulic motors 186, 188 when the pressure exceeds a predefined threshold. The hydraulic circuit 300 may also include directional control valves 302, 304 similar to the directional control valve 206 of FIG. 2.

The directional control valves 302, 304 may receive the pressurized fluid from the pump 204 of FIG. 2 via supply fluid lines 306, 308 respectively. The directional control valves 302, 304 may include a first directional control valve 302 to direct the pressurized fluid to the first hydraulic motor 186. The first directional control valve 302 may selectively direct the pressurized fluid to the first hydraulic motor 186 via a first fluid line 310 or a second fluid line 312 extending from the first directional control valve 302 to the hydraulic motor 140. Similarly, the directional control valves 302, 304 may include a second directional control valve 304 to direct the pressurized fluid to the second hydraulic motor 188. The second directional control valve 304 may selectively direct the pressurized fluid to the second hydraulic motor 188 via a third fluid line 314 or a fourth fluid line 316 extending from the second directional control valve 304 to the second hydraulic motor 188.

In an embodiment, the directional control valves 302, 304 may selectively direct the pressurized fluid to the hydraulic motors 186, 188 via the first fluid line 310 and the third fluid line 314 respectively to facilitate the rotation of the circle 160 (see FIG. 1) in a clockwise direction. Similarly, the directional control valves 302, 304 may selectively direct the pressurized fluid to the hydraulic motors 186, 188 via the second fluid line 312 and the fourth fluid line 316 respectively to facilitate the rotation of the circle 160 (see FIG. 1) in a counterclockwise direction.

For the rotation of the circle 160 in the clockwise direction, the first hydraulic motor 186 and the second hydraulic motor 188 may be configured to receive the pressurized fluid from the first directional control valve 302 and the second directional control valve 304 simultaneously via the first fluid line 310 and the third fluid line 314 respectively. In addition, the first hydraulic motor 186 and the second hydraulic motor 188 may also be configured to direct the discharged fluid back to the first directional control valve 302 and the second directional control valve 304 simultaneously via the second fluid line 312 and the fourth fluid line 316 respectively. The first directional control valve 302 and the second directional control valve 304 may, in turn, receive the discharged fluid and direct the discharged fluid to the tank 202 via a first discharge fluid line 330 and a second discharge fluid line 332 respectively. The first discharge fluid line 330 may extend from the first directional control valve 302 to the tank 202. The second discharge fluid line 332 may extend from the second directional control valve 304 to the tank 202.

The pressure relief valves 222, 224 may include a first pressure relief valve 222 coupled with the first fluid line 310 and the third fluid line 314. Similarly, the pressure relief valves 222, 224 may include a second pressure relief valve 224 coupled with the second fluid line 312 and fourth fluid line 316. The first pressure relief valve 222 may be configured to relieve the pressurized fluid in the first fluid line 310 and the third fluid line 314 respectively when the pressure exceeds the predefined threshold. The first pressure relief valve 222 may relieve the pressurized fluid by discharging a portion of the pressurized fluid from the first pressure relief valve 222 to the tank 202 via a first relief fluid line 340. Similarly, second pressure relief valve 224 may be configured to relieve the pressurized fluid in the second fluid line 312 and fourth fluid line 316 respectively when the pressure exceeds the predefined threshold. The second pressure relief valve 224 may relieve the pressurized fluid by discharging a portion of the pressurized fluid from the second pressure relief valve 224 to the tank 202 via a second relief fluid line 342. The pressure relief valves 222, 224 may thereby, limit the pressurized fluid supplied to the hydraulic motors 186, 188 respectively. Consequently, the pressure relief valves 222, 224 may limit the torque generated by the hydraulic motors 186, 188 to less than or equal to the torque capacity of the clutches 190, 192 respectively. In some embodiments, the predefined threshold defined by the pressure relief valves 222, 224 respectively may be varied in order to vary the torque generated by the hydraulic motors 186, 188.

In some embodiments, the second fluid line 312 may be coupled with an additional pressure relief valve (not shown) and may be independent of the second pressure relief valve 224. The additional pressure relief valve may relieve the pressurized fluid in the second fluid line 312. Similarly, the third fluid line 314 may be coupled with an additional pressure relief valve (not shown) and may be independent of the first pressure relief valve 222. The additional pressure relief valve may relieve the pressurized fluid in the third fluid line 314. The additional pressure relief valves coupled with the second fluid line 312 and the third fluid line 314 respectively may in turn be connected to the tank 202 via respective relief fluid lines (not shown) similar to relief fluid lines 340, 342.

INDUSTRIAL APPLICABILITY

The pressure relief valves 222, 224 provided in the hydraulic circuits 200, 300 may relieve the pressurized fluid supplied to a hydraulic motor, such as the hydraulic motors 172, 186 or 188, when the pressure exceeds the predefined threshold. The pressure relief valves 222, 224 may thereby limit the torque generated by the hydraulic motors to less than or equal to the torque capacity of a clutch, such as the clutches, 182, 190, or 192, provided in the circle drive system 170 of the motor grader 100. Hence, the pressure relief valves 222, 224 may protect the clutch from overheating and/or failing. As a result, pressure relief valves 222, 224 may also improve a lifespan of the clutch.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A motor grader, comprising:
    a moldboard configured for grading a surface;
    a circle coupled with the moldboard to facilitate a rotation of the moldboard; and
    a circle drive system for the circle, wherein the circle drive system includes:
        at least one hydraulic motor configured to receive a pressurized fluid and generate a torque for the rotation of the circle and the moldboard,
        a gearbox to transfer the torque generated by the hydraulic motor to the circle,
        a clutch connected to the at least one hydraulic motor at one end and to the gearbox at another end, and
        a hydraulic circuit to supply the pressurized fluid to the hydraulic motor, the hydraulic circuit including at least one pressure relief valve configured to relieve the pressurized fluid supplied to the at least one hydraulic motor when a pressure of the pressurized fluid exceeds a predefined threshold, thereby limiting the torque generated by the at least one hydraulic motor to less than or equal to a torque capacity of the clutch;
        the hydraulic circuit further including a tank to store a fluid, a pump configured to draw the fluid from the tank and pressurize the fluid, and at least one directional control valve that receives the pressurized fluid from the pump and directs the pressurized fluid to the at least one hydraulic motor via the at least one pressure relief valve;
    wherein the at least one pressure relief valve relieves the pressure of the pressurized fluid by discharging a portion of the pressurized fluid from the at least one pressure relief valve to the tank via at least one relief fluid line when the pressure of the pressurized fluid exceeds the predefined threshold; and
    wherein the at least one pressure relief valve includes a first pressure relief valve coupled with a first fluid line extending from the at least one directional control valve to the at least one hydraulic motor, and a second pressure relief valve coupled to a second fluid line extending from the at least one directional control valve to the at least one hydraulic motor.

2. The motor grader of claim 1, wherein the at least one hydraulic motor is a bi-directional motor that is configured to:
    receive the pressurized fluid from the first fluid line, facilitate the rotation of the circle in a clockwise direction, and discharge fluid to the at least one directional control valve via the second fluid line, and
    receive the pressurized fluid from the second fluid line, facilitate the rotation of the circle in a counterclockwise direction, and discharge fluid to the at least one directional control valve via the first fluid line.

3. The motor grader of claim 2, wherein the at least one directional control valve receives discharged fluid from the at least one hydraulic motor via one of the first fluid line and the second fluid line and directs the discharged fluid to the tank via at least one discharge fluid line extending from the at least one directional control valve to the tank.

4. The motor grader of claim 1, wherein the at least one hydraulic motor includes a first hydraulic motor and a second hydraulic motor.

5. The motor grader of claim 4, wherein the at least one directional control valve includes:
    a first directional control valve configured to direct the pressurized fluid to the first hydraulic motor and receive discharged fluid from the first hydraulic motor via one of a first fluid line and a second fluid line, and direct the discharged fluid to the tank via a first discharge fluid line extending from the first directional control valve to the tank; and
    a second directional control valve configured to direct the pressurized fluid to the second hydraulic motor and receive discharged fluid from the second hydraulic motor via one of via a third fluid line and a fourth fluid line, and direct the discharged fluid to the tank via a second discharge fluid line extending from the second directional control valve to the tank.

6. The motor grader of claim 5, wherein the at least one pressure relief valve includes:
    a first pressure relief valve coupled with one of the first fluid line and the second fluid line extending from the first directional control valve to the first hydraulic motor; and
    a second pressure relief valve coupled with one of the third fluid line and the fourth fluid line extending from the second directional control valve to the second hydraulic motor.

7. A method for protecting a clutch driven by a hydraulic motor to operate a circle of a motor grader, comprising:
    providing at least one pressure relief valve to relieve a pressure of a pressurized fluid supplied to the hydraulic motor when a pressure of the pressurized fluid exceeds a predefined threshold, thereby limiting a torque generated by the hydraulic motor to less than or equal to a torque capacity of the clutch;

drawing a fluid from a tank and supplying the pressurized fluid to a directional control valve; and selectively directing the pressurized fluid from the directional control valve to the hydraulic motor;

providing a first pressure relief valve of the at least one pressure relief valve coupled to a first fluid line extending from the directional control valve to the hydraulic motor; and providing a second pressure relief valve of the at least one pressure relief valve coupled to a second fluid line extending from the directional control valve to the hydraulic motor.

8. The method of claim 7, including:

discharging, by the first pressure relief valve, a portion of the pressurized fluid to the tank via a first relief fluid line extending from the first pressure relief valve to the tank when a pressure of the pressurized fluid in the first fluid line exceeds a predefined threshold.

9. The method of claim 7, including:

discharging, by the second pressure relief valve, a portion of the pressurized fluid to the tank via a second relief fluid line extending from the second pressure relief valve to the tank when a pressure of the pressurized fluid in the second fluid line exceeds a predefined threshold.

10. The method of claim 7, including:

receiving a discharged fluid from the hydraulic motor by the directional control valve via one of the first fluid line and the second fluid line; and directing the discharged fluid from the directional control valve to the tank via at least one discharge fluid line extending from the directional control valve to the tank.

11. The method of claim 7, including:

supplying the pressurized fluid from a first directional control valve of the directional control valve to a first hydraulic motor of the hydraulic motor via one of the first fluid line and the second fluid line extending from the first directional control valve to the first hydraulic motor; and supplying the pressurized fluid from a second directional control valve of the directional control valve to a second hydraulic motor of the hydraulic motor via one of a third fluid line and a fourth fluid line extending from the second directional control valve to the second hydraulic motor.

12. The method of claim 11, including:

receiving a discharged fluid from the first hydraulic motor by the first directional control valve via one of the first fluid line and the second fluid line;

directing the discharged fluid from the first directional control valve to the tank via a first discharge fluid line extending from the first directional control valve to the tank;

receiving a discharged fluid from the second hydraulic motor by the second directional control valve via one of the third fluid line and the fourth fluid line; and directing the discharged fluid second directional control valve to the tank via a second discharge fluid line extending from the second directional control valve to the tank.

13. A circle drive system for a circle in a motor grader, comprising:

at least one hydraulic motor configured to receive a pressurized fluid and generate a torque for a rotation of the circle and a moldboard coupled with the circle;

a gearbox to transfer the torque generated by the at least one hydraulic motor to the circle;

a clutch to control the torque supplied to the gearbox from the hydraulic motor; and a hydraulic circuit to supply the pressurized fluid to the hydraulic motor, the hydraulic circuit including at least one pressure relief valve configured to relieve a pressure of the pressurized fluid supplied to the at least one hydraulic motor when a pressure of the pressurized fluid exceeds a predefined threshold, thereby limiting the torque generated by the at least one hydraulic motor to less than or equal to a torque capacity of the clutch;

the hydraulic circuit further including a tank to store a fluid, a pump configured to draw the fluid from the tank and pressurize the fluid, and at least one directional control valve that receives the pressurized fluid from the pump and directs the pressurized fluid to the at least one hydraulic motor via the at least one pressure relief valve;

wherein the at least one pressure relief valve includes a first pressure relief valve coupled with a first fluid line extending from the at least one directional control valve to the at least one hydraulic motor, and a second pressure relief valve coupled to a second fluid line extending from the at least one directional control valve to the at least one hydraulic motor.

14. The circle drive system of claim 13, wherein the at least one pressure relief valve relieves the pressure of the pressurized fluid by discharging a portion of the pressurized fluid from the at least one pressure relief valve to the tank via at least one relief fluid line when the pressure of the pressurized fluid exceeds the predefined threshold.

15. The circle drive system of claim 13, wherein the at least one hydraulic motor includes a first hydraulic motor and a second hydraulic motor.

16. The circle drive system of claim 15, wherein the at least one directional control valve includes:

a first directional control valve configured to direct the pressurized fluid to the first hydraulic motor and receive discharged fluid from the first hydraulic motor via one of the first fluid line and a third fluid line, and direct the discharged fluid to the tank via a first discharge fluid line extending from the first directional control valve to the tank; and a second directional control valve configured to direct the pressurized fluid to the second hydraulic motor and receive discharged fluid from the second hydraulic motor via one of via the second fluid line and a fourth fluid line, and direct the discharged fluid to the tank via a second discharge fluid line extending from the second directional control valve to the tank.

* * * * *